United States Patent
Wang et al.

(10) Patent No.: US 11,691,235 B2
(45) Date of Patent: Jul. 4, 2023

(54) TOOLHOLDER MATCHED WITH THE INTERNAL JET COOLING SPINDLE FOR CRYOGENIC COOLANT

(71) Applicant: DALIAN UNIVERSITY OF TECHNOLOGY, Liaoning (CN)

(72) Inventors: Yongqing Wang, Liaoning (CN); Lingsheng Han, Liaoning (CN); Kuo Liu, Liaoning (CN); Haibo Liu, Liaoning (CN); Zaiyou Ban, Liaoning (CN); Bo Qin, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 340 days.

(21) Appl. No.: 15/734,912

(22) PCT Filed: Sep. 12, 2019

(86) PCT No.: PCT/CN2019/105528
§ 371 (c)(1),
(2) Date: Dec. 3, 2020

(87) PCT Pub. No.: WO2021/046786
PCT Pub. Date: Mar. 18, 2021

(65) Prior Publication Data
US 2021/0178542 A1 Jun. 17, 2021

(51) Int. Cl.
*B23Q 11/10* (2006.01)
*B23B 31/02* (2006.01)

(52) U.S. Cl.
CPC .......... *B23Q 11/1023* (2013.01); *B23B 31/02* (2013.01); *B23B 2250/12* (2013.01);
(Continued)

(58) Field of Classification Search
CPC ............ Y10T 279/3487; Y10T 408/44; Y10T 408/45; Y10T 408/455; Y10T 408/94;
(Continued)

(56) References Cited

U.S. PATENT DOCUMENTS

| 5,405,220 A | * | 4/1995 | Ishikawa ............... B23B 31/208 279/20 |
| 5,567,093 A | * | 10/1996 | Richmond ........... B23Q 1/0036 279/46.9 |
| 6,601,857 B1 | * | 8/2003 | Richmond ........ B23B 31/20125 277/622 |
| 6,644,900 B1 | * | 11/2003 | Sugata ..................... B23Q 1/70 408/59 |

(Continued)

FOREIGN PATENT DOCUMENTS

| CN | 201279702 Y | * | 7/2009 |
| CN | 202804765 U |   | 3/2013 |

(Continued)

OTHER PUBLICATIONS

EPO Machine Translation of CN106964828A—"An Ultra-low Temperature Medium Spindle Direct Transmission Type Hollow Handle", Jul. 21, 2017.*

*Primary Examiner* — Sunil K Singh
*Assistant Examiner* — Michael Vitale
(74) *Attorney, Agent, or Firm* — Muncy, Geissler, Olds & Lowe, P.C.

(57) ABSTRACT

A toolholder matched with the internal jet cooling spindle for cryogenic coolant is mainly composed of a hollow toolholder body, a high-performance thermal insulation structure and a bidirectional sealing structure. They can guide the cryogenic coolant from the spindle to the internal cooling channel of cutting tool and realize the cryogenic thermal insulation and dynamic sealing. The high-performance thermal insulation structure inside the toolholder employs the material with a low thermal conductivity and a low linear expansion coefficient to restrain the low temperature impact of cryogenic coolant on the toolholder and spindle, to ensure the dimensional accuracy and assembly (Continued)

accuracy of the toolholder. The bidirectional sealing structure in the toolholder uses the ultra-low temperature resistant seal rings to prevent the cryogenic coolant from leaking towards the spindle and the cutting tool, to ensure the stability of the coolant transport.

2 Claims, 2 Drawing Sheets

(52) U.S. Cl.
CPC .......... *Y10T 408/455* (2015.01); *Y10T 408/95* (2015.01); *Y10T 409/30952* (2015.01); *Y10T 409/304032* (2015.01)

(58) Field of Classification Search
CPC ............... Y10T 408/95; Y10T 408/957; Y10T 409/303976; Y10T 409/304032; Y10T 409/30952; B23B 2231/24; B23B 2250/12; B23Q 11/10; B23Q 11/1023
USPC ...... 409/135, 136, 234; 408/56, 57, 59, 238, 408/238 A, 239 A, 239 R; 279/156
See application file for complete search history.

(56) References Cited

U.S. PATENT DOCUMENTS

| | | | |
|---|---|---|---|
| 7,156,589 B2 * | 1/2007 | Sugata | B23Q 11/1023 408/59 |
| 8,029,216 B2 * | 10/2011 | Guy | B23B 31/005 279/42 |
| 9,358,618 B2 | 6/2016 | Carlson et al. | |
| 2003/0180111 A1 * | 9/2003 | Sugata | B23Q 11/1015 408/58 |
| 2010/0272530 A1 * | 10/2010 | Rozzi | B23Q 11/1053 408/56 |
| 2013/0230361 A1 * | 9/2013 | Stagge | B23B 31/005 409/234 |
| 2021/0347000 A1 * | 11/2021 | Wang | B23Q 3/12 |

FOREIGN PATENT DOCUMENTS

| | | | | |
|---|---|---|---|---|
| CN | 202878022 U | | 4/2013 | |
| CN | 103962584 A | * | 8/2014 | ............... B23Q 1/70 |
| CN | 104015079 A | | 9/2014 | |
| CN | 106964828 A | | 7/2017 | |
| CN | 109648372 A | | 4/2019 | |
| CN | 110883592 A | * | 3/2020 | ......... B23Q 11/1023 |
| WO | WO 2016053050 A1 | | 4/2016 | |

* cited by examiner

TOOLHOLDER MATCHED WITH THE INTERNAL JET COOLING SPINDLE FOR CRYOGENIC COOLANT

TECHNICAL FIELD

The invention belongs to the technical field of NC machine tools, and specifically relates to a toolholder matched with the internal jet cooling spindle for cryogenic coolant.

BACKGROUND

In recent years, it has been found that the cryogenic machining using liquid nitrogen as the coolant has a well effect on improving the machinability of difficult-to-cut materials. Especially, the internal jet cooling mode through the tool has a higher cooling efficiency and utilization rate of coolant. In this mode, the cryogenic coolant is guided to the tool nose through the inner hollow channels of the spindle, toolholder and tool to directly cool the cutting zone. Thereby, it is urgent to develop the device for cryogenic machining with internal jet cooling of coolant.

As an important accessory of machine tools, the toolholder is the key component of the cryogenic machine tool to realize internal jet cooling function of cryogenic coolant. For example, liquid nitrogen is forced to flow inside the channel of the toolholder after leaving from the spindle. In this process, material shrinkage or even freezing of the toolholder and the spindle are inevitably produced due to the ultra-low temperature of liquid nitrogen ($<-170°$ C.), resulting in structure deformation, assembly failure, lubrication failure, rotation failure, etc. The dimensional precision of the toolholder plays a crucial role in ensuring the machining accuracy, hence cryogenic deformation of the toolholder can cause the loss of machining accuracy.

There is a gap inside the liquid nitrogen transport channel in the toolholder, so that the sealing should be assured except for the thermal insulation to ensure the transport stability of liquid nitrogen. In view of the fact that regular BT and HSK internal cooling toolholders have not the ability of thermal insulation and seal under the ultra-low temperature and it is not viable to only process one hollow channel in the toolholder, thereby it is necessary to develop a hollow toolholder matched with the internal jet cooling spindle for cryogenic coolant. However, the thermal insulation and cryogenic sealing are extremely difficult on account of the narrow space inside the toolholder. Also, a valid locking mode between the toolholder and the spindle need to be proposed since the normal mechanism of toolholder tension cannot be used. The above problems put forward high requirements for thermal insulation, sealing at the ultra-low temperature and the tension structure of the toolholder for liquid nitrogen transport.

At present, some hollow toolholder devices have been developed for cryogenic coolant such as liquid nitrogen by research institutions. In 2014, as described in the patent "A internal jet cooling toolholder device for liquid nitrogen" (Application No.: CN201410228633.8) from Dalian University of Technology, the function of thermal insulation and sealing for liquid nitrogen are realized by the thermal insulation modification of surface materials and employing the ultra-low temperature resistant seal. However, the internal jet cooling function of the toolholder is dependent on the external liquid nitrogen supply and transmission system, so that it cannot be used matched with the internal jet cooling spindle for cryogenic coolant. In 2017, as described in the patent "A hollow toolholder directly connecting with the internal jet cooling spindle for cryogenic coolant" (Application No.: CN201710111738.9) from Dalian University of Technology, the toolholder belongs to an accessory of the internal jet cooling spindle. The well thermal insulation component and a multilayer sealing structure are used to realize the heat insulation and seal while liquid nitrogen is transported from the spindle to the toolholder. However, its thermal insulation structure is too complex to maintain the installation accuracy in the low-temperature environment. Also, the mechanism of toolholder tension about adopting thread to lock the inner hole of the cone in the toolholder and the pull nail is not reliable.

SUMMARY

The present invention aims at improving the current situation, where it is difficult to realize high-efficiency thermal insulation and dynamic sealing of cryogenic coolant inside the toolholder during the coolant flows form the spindle to the cutting tool, proposing a toolholder matched with the internal jet cooling spindle for cryogenic coolant.

The Technical Solution of the Invention

A toolholder matched with the internal jet cooling spindle for cryogenic coolant, which is mainly composed of a hollow toolholder body, a high-performance thermal insulation structure and a bidirectional sealing structure. The hollow toolholder body is of a hollow structure to provide a channel for cryogenic coolant transport. The high-performance thermal insulation structure is arranged inside the hollow structure of the hollow toolholder body to suppress the diffusion of the cryogenic temperature field to the toolholder and spindle. The bidirectional sealing structure is designed in the hollow toolholder body to prevent the leakage of cryogenic medium towards the spindle and the cutting tool. In addition, the high-performance thermal insulation structure and the bidirectional sealing structure are simple and efficient, and the material of high-performance thermal insulation structure has a low linear expansion coefficient to ensure the assembly accuracy. The toolholder and spindle are locked by the flange connection, which is firm and reliable.

The hollow toolholder body is toolholder body 1.1. Outer cone surface 1.*i* of the toolholder body 1.1 is the positioning surface connected with spindle 2.1. External thread 1.*c* on the front outer circle is used to install locking nut 1.9 for clamping the cutting tool. Inner cone surface 1.*h* on the front end is used to install spring collet 1.8. The above three surfaces are the main working surfaces of the toolholder. The hollow toolholder body provides the cryogenic coolant transport channel as well as the installation space and positioning surface required by the high-performance thermal insulation structure and bidirectional sealing structure. Inner cavity bottom surface 1.*a*, inner cavity surface 1.*j*, inner hole 1.*n*, tool escape 1.*m* and internal thread 1.*b* are processed in the toolholder body 1.1. The internal thread 1.*b* is connected with the inner cone surface 1.*h*. The tool escape 1.*m* is located between the internal thread 1.*b* and the inner cavity surface 1.*j*. The inner cavity surface 1.*j* is a cylindrical surface which is located inside the outer cone surface 1.*i*. The inner cavity bottom surface 1.*a* is the vertical bottom surface of the inner cavity surface 1.*j* which is located in the end direction of the toolholder body 1.1. The inner hole 1.*n* is located in the thinnest end of the outer cone surface 1.*i*, and shaft 2.3 inside spindle 2.1 extends into the toolholder body 1.1 through the inner hole 1.n to transmit cryogenic coolant. There are four flange-via holes 1.7 on the horizontal flange surface of the toolholder body 1.1, which are used to connect and fastening the spindle 2.1. The horizontal flange surface is located between the outer cone surface 1.i and the external thread 1.c.

The high-performance thermal insulation structure orderly includes the thermal insulation sleeve 1.3, compression sleeve 1.4 and locking sleeve 1.6. The thermal insulation sleeve 1.3 is located inside the inner cavity surface 1.j, which is the main structure to isolate the cryogenic coolant from the toolholder body 1.1. The compression sleeve 1.4 is installed in the inner thread 1.b to provide a compression force for the thermal insulation sleeve 1.3 and an installation groove for the outer seal ring 1.5. The locking sleeve 1.6 is also installed in the inner thread 1.b, which is used to press out outer seal ring 1.5 and fasten the compression sleeve 1.4.

The bidirectional sealing structure includes inner seal ring 1.2 and outer seal ring 1.5 which are ultra-low temperature resistant. The inner seal ring 1.2 and the outer seal ring 1.5 are located inside the toolholder body 1.1 to prevent cryogenic coolant from leaking towards the spindle and the tool.

While assembling the toolholder, first the inner seal ring 1.2 is pushed into the toolholder body 1.1 along the inner cavity surface 1.j while the sealing surface is outward, meanwhile the opposite side of the inner seal ring 1.2 is ensured in contact with the inner cavity bottom surface 1.a. The thermal insulation sleeve 1.3 is installed into the toolholder body 1.1 along the inner cavity surface 1.j in the form of interference until it is pressed against the inner seal ring 1.2, meanwhile the tool positioning plane 1.g on the thermal insulation sleeve 1.3 is kept outward. Then two auxiliary holes I 1.d on the compression sleeve 1.4 are clamped with a tooling to screw the compression sleeve 1.4 along the internal thread 1.b until it is pressed against the thermal insulation sleeve 1.3. Finally, the outer seal ring 1.5 is installed into the groove of the compression sleeve 1.4 while its sealing surface is inward, and the two auxiliary holes II 1.e are clamped with the tooling so that the locking sleeve 1.6 is screwed along the internal thread 1.b to press out the outer seal ring 1.5. Finally, the inner seal ring 1.2, the thermal insulation sleeve 1.3, the compression sleeve 1.4 and the outer seal ring 1.5 are orderly pressed out. Meanwhile, the locking function is realized by the compression sleeve 1.4 and the locking sleeve 1.6, the toolholder assembly is ultimately accomplished.

While installing the cutting tool, first the spring collet 1.8 is installed into the locking nut 1.9, and the end face 1.k is superposed. The locking nut 1.9 along with the spring collet 1.8 is screwed on the toolholder body 1.1 along the external thread 1.c. Then, the internal cooling tool 2.4 is inserted into the spring collet 1.8 until its end face is pressed against the tool positioning plane 1.g of the thermal insulation sleeve 1.3, meanwhile the outer surface of the internal cooling tool 2.4 and the inner surface of the outer seal ring 1.5 have an interference fit. Finally, the locking nut 1.9 is tightened using a wrench, the cutting tool installation is ultimately accomplished.

During processing, the outer cone surface 1.i of the toolholder body 1.1 which has been assembled and installed with the tool is installed into the cone hole of the spindle 2.1. The shaft 2.3 is inserted into the toolholder body 1.1 through the inner hole 1.n and formed an interference fit with the inner seal ring 1.2. A certain gap is retained between the shaft end face 2.a and the thermal insulation sleeve inner end face 1.f. The four bolts 1.10 are screwed into the four spindle threaded holes 2.2 through the four flange-via holes 1.7, and a torque wrench is used to tighten with a value. Thus, the outer cone surface 1.i of the toolholder body 1.1 and the cone surface of spindle 2.1 are closely matched to realize the installation and position of the toolholder. While the cryogenic coolant delivery system is started, liquid nitrogen is jetted to the nose of blade 2.5 through the shaft inner channel 3.1, the toolholder inner channel 3.2 and the tool inner channel 3.3 orderly.

The advantages of the invention include that the hollow toolholder as a special accessory of the internal jet cooling spindle is used to realize the internal transport of the cryogenic coolant. Materials with the low thermal conductivity and low linear expansion coefficient are employed for the high-performance thermal insulation sleeve to effectively suppress the ultra-low temperature impact on the toolholder and spindle, weaken the gasification of cryogenic coolant induced by environment temperature, and ensure the dimensional accuracy and fitting accuracy of the inner structure of toolholder. The bidirectional sealing structure prevents the cryogenic coolant from leaking inward to the spindle and escaping outward from the gap of toolholder, which prevents the diffusion of cryogenic cold source and ensures the transport stability of coolant. Structures of the high-performance thermal insulation and bidirectional seal guarantee the accuracy of toolholder during processing. The locking mode of flange connection is simple, safe, and reliable.

Figure 1:
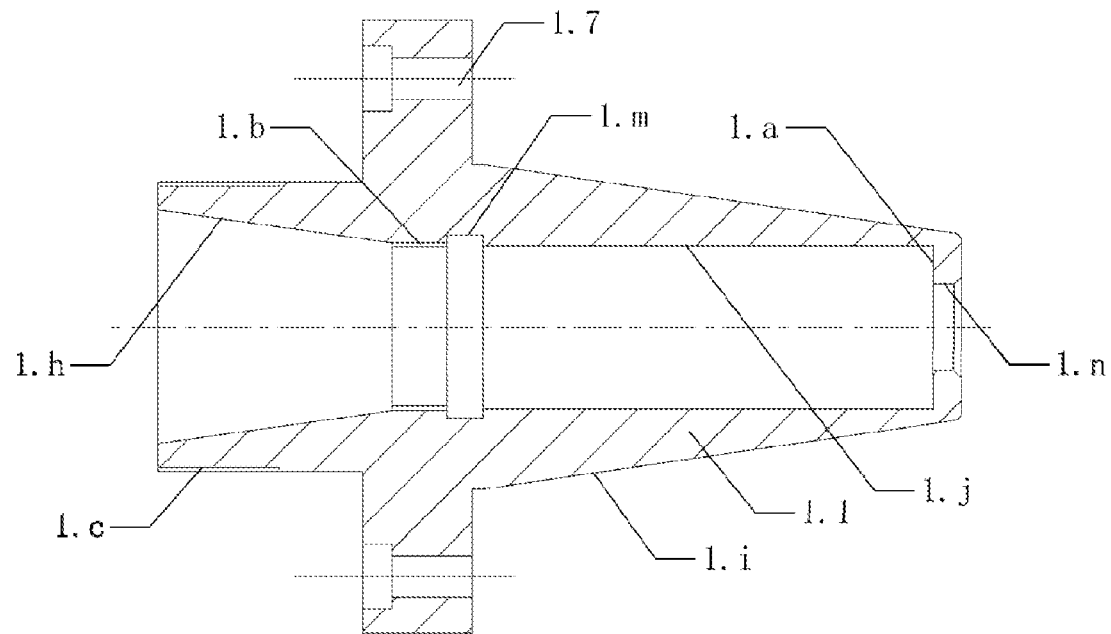
FIG. 1 is the schematic diagram of the toolholder body 1.1.

In Figure: 1.1—toolholder body; 1.2—inner seal ring; 1.3—thermal insulation sleeve; 1.4—compression sleeve; 1.5—outer seal ring; 1.6—locking sleeve; 1.7—flange-via hole; 1.8—spring collet; 1.9—locking nut; 1.10—bolt; 1.a—inner cavity bottom surface; 1.b—internal thread; 1.c—external thread; 1.d—auxiliary hole I; 1.e—auxiliary hole II; 1.f—thermal insulation sleeve inner end face; 1.g—tool positioning plane; 1.h—inner cone surface; 1.i—outer cone surface; 1.j—inner cavity surface; 1.k—end face; 1.m—tool escape; 1.n—inner hole; 2.1—spindle; 2.2—spindle threaded holes; 2.3—shaft; 2.4—internal cooling tool; 2.5—blade; 2.a—shaft end face; 3.1—shaft inner channel; 3.2—toolholder inner channel; 3.3—tool inner channel; 4.1—temperature sensor.

DETAILED DESCRIPTION

The specific embodiments of the present invention will be described in detail below with reference to the drawings and technical solutions:

In the embodiment, the cryogenic coolant is liquid nitrogen, and the material of thermal insulation sleeve 1.3, compression sleeve 1.4 and locking sleeve 1.6 are all modified polyimide with thermal conductivity less than 0.15 W/(m·K). The wall thickness of thermal insulation sleeve 1.3 is 8 mm. The inner seal ring 1.2 and outer seal ring 1.5 are lip seals, and their materials are carburized polytetrafluoroethylene. The working temperature for seals ranges from −200 to 260° C., the maximum pressure is 3 MPa. The type of toolholder body 1.1 is BT40, the accuracy of cone is AT3 and its hardness is more than HRC55. The type of spring collet 1.8 is ER32, and its inner diameter is Φ13-14. The shaft 2.3 is of vacuum insulation structure. The outer diameter of the internal cooling tool 2.4 is 14 mm. The measurement range of temperature sensor 4.1 is −200-100° C.

Figure 2:
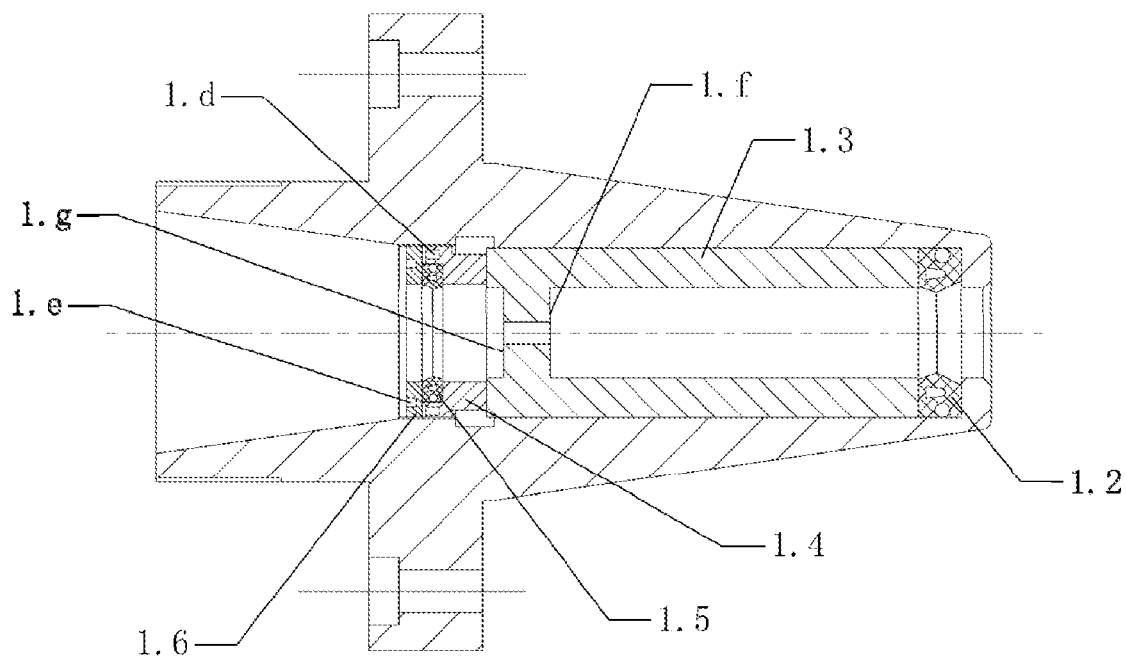
FIG. 2 is the schematic diagram of the toolholder assembly.
Figure 3:
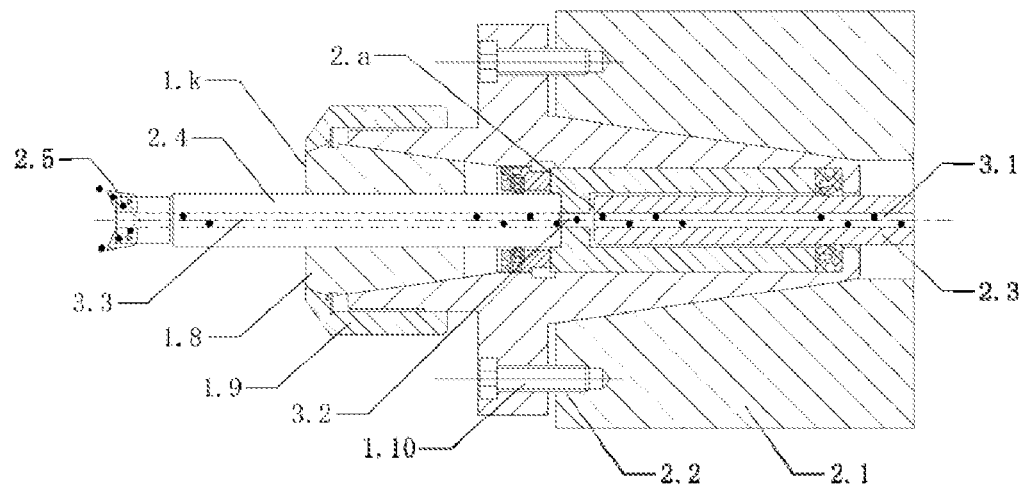
FIG. 3 is the schematic diagram of the installation of toolholder and spindle.

The assembly and installation process of the toolholder is as follows. As shown in FIGS. 1, 2 and 3, step one, the sealing surface of the inner seal ring 1.2 and the tool positioning plane 1.*g* of the thermal insulation sleeve 1.3 are kept outward. And then the inner seal ring 1.2 and the thermal insulation sleeve 1.3 are orderly pushed into the toolholder body 1.1 along the inner cavity surface 1.*j* in the way of interference fit, until the inner seal ring 1.2 is pressed against the inner cavity bottom surface 1.*a* meanwhile the thermal insulation sleeve 1.3 is pressed against the inner seal ring 1.2. The two auxiliary holes I 1.*d* on the compression sleeve 1.4 are clamped with a tooling to screw the compression sleeve 1.4 along the internal thread 1.*b* until it is pressed against the thermal insulation sleeve 1.3. The outer seal ring 1.5 is installed into the groove of the compression sleeve 1.4 while its sealing surface is inward. The two auxiliary holes II 1.*e* are clamped with the tooling to screw the locking sleeve 1.6 along the internal thread 1.*b* and press out the outer seal ring 1.5.

Step two, the spring collet 1.8 is installed into the locking nut 1.9 meanwhile the end face 1.*k* is ensured coincident. Then, the locking nut 1.9 with the spring collet 1.8 is screwed on the toolholder body 1.1 along the external thread 1.*c*. The internal cooling tool 2.4 is inserted into the spring collet 1.8 until its end face is pressed against the tool positioning plane 1.*g* of the thermal insulation sleeve 1.3, also, the outer surface of the internal cooling tool 2.4 and the inner surface of the outer seal ring 1.5 have an interference fit. Finally, the locking nut 1.9 is tightened using a wrench.

Step three, the outer cone surface 1.*i* of the toolholder body 1.1 is installed into the cone hole of the spindle 2.1. The shaft 2.3 is inserted into the toolholder body 1.1 through the inner hole 1.*n* to form an interference fit with the inner seal ring 1.2. The shaft end face 2.*a* and the thermal insulation sleeve inner end face 1.*f* keep a gap of 1 mm. The four bolts 1.10 are screwed into the four spindle threaded holes 2.2 through the four flange-via holes 1.7. A torque wrench is used to tighten the four bolts 1.10 with a torque of 10 N·m, so that the outer cone surface 1.*i* of the toolholder body 1.1 is fitted closely with the cone surface of the spindle 2.1.

Figure 4:
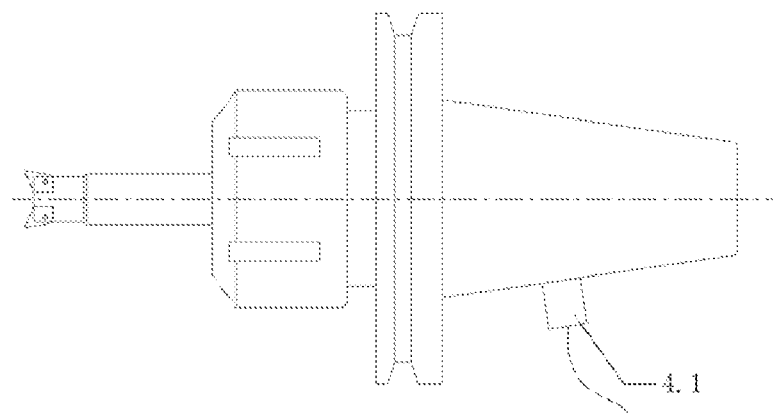
FIG. 4 is the schematic diagram of the temperature measurement of cone surface of the toolholder.
Figure 5:
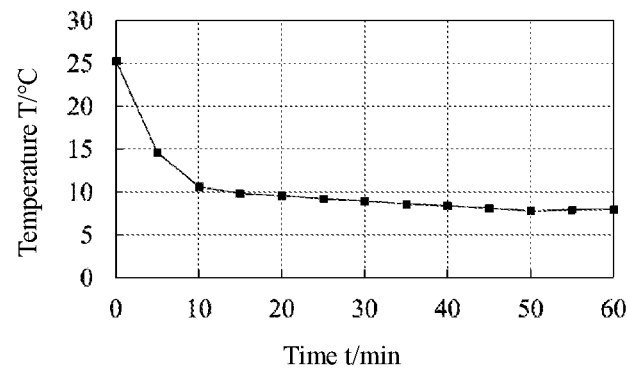
FIG. 5 is the temperature curve of the cone surface of toolholder.

Step four, the liquid nitrogen convey system is started, and then liquid nitrogen is jetted to the nose of blade 2.5 through the shaft inner channel 3.1, the toolholder inner channel 3.2 and the tool inner channel 3.3 in turn. At the moment, the machining can be started. The machining is stopped every 5 minutes and the toolholder is removed, and then the temperature of the outer cone surface 1.*i* is measured by the temperature sensor 4.1. The measurement process and results are shown in FIG. 4 and FIG. 5, respectively. The results show that the surface temperature of the toolholder is about 8° C. and no frost is found.

The invention effectively eliminates the ultra-low temperature impact of cryogenic coolant on the toolholder through the thermal insulation and sealing structure, to ensure the accuracy of the toolholder and the stability of liquid nitrogen transport. The toolholder accomplishes the connection between the internal jet cooling spindle and the internal cooling tool, to assist the special cryogenic cooling machine tool to implement cryogenic machining under the internal jet cooling mode of cryogenic coolant. For the toolholder, the integral structure is simple, the integration is good, as well as the operation is safe and reliable.

The invention claimed is:

1. A toolholder matched with an internal jet cooling spindle for cryogenic coolant, wherein the toolholder comprises:
   a hollow toolholder body, a high-performance thermal insulation structure and a bidirectional sealing structure; wherein
   the hollow toolholder body is of a hollow structure to provide a channel for cryogenic coolant transport; the high-performance thermal insulation structure is arranged inside the hollow structure of the hollow toolholder body to suppress diffusion of a cryogenic temperature field to the toolholder and the spindle; and the bidirectional sealing structure is seated in the hollow toolholder body to prevent a leakage of the cryogenic coolant towards the spindle and a cutting tool;
   an outer cone surface of the hollow toolholder body is a positioning surface connected with the spindle; an external thread on a front outer circle is used to install a locking nut for clamping the cutting tool; an inner cone surface on a front end is used to install a spring collet; the outer cone surface, the external thread and the inner cone surface are main working surfaces of the toolholder; the hollow toolholder body provides the channel for the cryogenic coolant transport as well as an installation space and positioning surface required by the high-performance thermal insulation and bidirectional sealing structures; an inner cavity bottom surface, an inner cavity surface, an inner hole, a tool escape, and an internal thread are cut in the hollow toolholder body; the internal thread is connected with the inner cone surface; the tool escape is located between the internal thread and the inner cavity surface; the inner cavity surface is a cylindrical surface which is located inside the outer cone surface; the inner cavity bottom surface is a bottom surface of the inner cavity surface which is located in an end direction of the hollow toolholder body; the inner hole is located in a thinnest end of the outer cone surface, and a shaft inside spindle extends into the hollow toolholder body through the inner hole to transmit the cryogenic coolant; and there are four flange-via holes on a horizontal flange surface of the hollow toolholder body, which are used to connect and fasten the spindle; wherein the horizontal flange surface is located between the outer cone surface and the external thread;
   the high-performance thermal insulation structure includes, in order, a thermal insulation sleeve, a compression sleeve and a locking sleeve; the thermal insulation sleeve is located inside the inner cavity surface, which is the main structure to isolate the cryogenic coolant from the hollow toolholder body; the compression sleeve is installed in the inner thread to provide a compression force for the thermal insulation sleeve and an installation groove for an outer seal ring; and the locking sleeve is also installed in the inner thread, which is used to press out the outer seal ring and fasten the compression sleeve; and
   the bidirectional sealing structure includes an inner seal ring and the outer seal ring which are ultra-low temperature resistant; and the inner seal ring and the outer seal ring are located inside the hollow toolholder body to prevent the cryogenic coolant from leaking towards the spindle and the cutting tool;

wherein, while assembling the toolholder, first the inner seal ring is pushed into the hollow toolholder body along the inner cavity surface while a sealing surface is toward the outside, meanwhile an opposite side of the inner seal ring is in contact with the inner cavity bottom surface; the thermal insulation sleeve is installed into the hollow toolholder body along the inner cavity surface, there is an interference fit between the thermal insulation sleeve and the hollow toolholder body until it is pressed against the inner seal ring, meanwhile the tool positioning plane on the thermal insulation sleeve is kept toward the outside; then two auxiliary holes I on the compression sleeve are clamped with a tooling to screw the compression sleeve along the internal thread until the compression sleeve is pressed against the thermal insulation sleeve; then the outer seal ring is installed into the installation groove of the compression sleeve while its sealing surface is oriented inward, and the two auxiliary holes II are clamped with the tooling so that the locking sleeve is screwed along the internal thread to press out the outer seal ring; finally, the inner seal ring, the thermal insulation sleeve, the compression sleeve, and the outer seal ring are pressed out; meanwhile, the locking function is realized by the compression sleeve and the locking sleeve, and construction of the toolholder assembly has been accomplished;

wherein, while installing the cutting tool, first the spring collet is installed into the locking nut, and an end face of the spring collet and the locking nut is superposed; the locking nut along with the spring collet is screwed on the hollow toolholder body along the external thread; then, an internal cooling tool is inserted into the spring collet until its end face is pressed against the tool positioning plane of the thermal insulation sleeve, meanwhile the outer surface of the internal cooling tool and the inner surface of the outer seal ring have an interference fit; finally, the locking nut is tightened using a wrench, and installation of the cutting tool has been accomplished; and during processing, the outer cone surface of the hollow toolholder body which has been assembled and installed with the tool is installed into a cone hole of the spindle; the shaft is inserted into the toolholder body through the inner hole and forms an interference fit with the inner seal ring; a gap is retained between a shaft end face and the thermal insulation sleeve inner end face; four bolts are screwed into four spindle threaded holes through the four flange-via holes, and a torque wrench is used to tighten the four bolts with a certain value of torque; thus, the outer cone surface of the hollow toolholder body and the cone surface of the spindle are closely matched to realize the installation and position of the toolholder; while the cryogenic coolant delivery system is started, the cryogenic coolant is jetted to a nose of a blade of the cutting tool through a shaft inner channel, a toolholder inner channel and a tool inner channel.

2. The toolholder matched with the internal jet cooling spindle for cryogenic coolant according to claim 1, wherein the hollow toolholder body and the spindle are connected and fastened by the flange surface.

* * * * *